(12) United States Patent
Carlson

(10) Patent No.: US 8,609,223 B2
(45) Date of Patent: Dec. 17, 2013

(54) INTERFOLDED NAPKINS AND METHOD FOR INTERFOLDING NAPKINS

(75) Inventor: Paul Carlson, Appleton, WI (US)

(73) Assignee: SCA Hygiene Products AB, Gothenburg (SE)

( * ) Notice: Subject to any disclaimer, the term of this patent is extended or adjusted under 35 U.S.C. 154(b) by 173 days.

(21) Appl. No.: 13/341,219

(22) Filed: Dec. 30, 2011

(65) Prior Publication Data

US 2013/0171408 A1   Jul. 4, 2013

(51) Int. Cl.
*B32B 3/04* (2006.01)

(52) U.S. Cl.
USPC ............................................ 428/126; 428/130

(58) Field of Classification Search
USPC ...................... 428/126, 130; 221/48
See application file for complete search history.

(56) References Cited

U.S. PATENT DOCUMENTS

| | | | |
|---|---|---|---|
| 1,427,420 A | 8/1922 | Sargent | |
| 1,632,446 A | 6/1927 | Krueger | |
| 1,666,553 A | 4/1928 | Christman | |
| 2,244,630 A | 6/1941 | Metternich | |
| 3,285,599 A | 11/1966 | Pherson et al. | |
| 3,291,479 A | 12/1966 | Greiner et al. | |
| 5,118,554 A | 6/1992 | Chan et al. | |
| 5,736,224 A | 4/1998 | Dodge | |
| 6,090,467 A | 7/2000 | Yip | |
| 6,213,346 B1 | 4/2001 | Skerrett et al. | |
| 6,296,144 B1 | 10/2001 | Tanaka et al. | |
| 6,602,575 B2 | 8/2003 | Lefevre et al. | |
| 7,178,689 B2 | 2/2007 | Wieser et al. | |
| 7,611,765 B2 | 11/2009 | Hochtritt et al. | |
| 7,624,765 B2 | 12/2009 | Burazin et al. | |
| 2005/0056657 A1 | 3/2005 | Hochtritt et al. | |
| 2010/0055391 A1 | 3/2010 | Penfield | |
| 2012/0107544 A1 | 5/2012 | Formon et al. | |

OTHER PUBLICATIONS

International Search Report and Written Opinion of the International Searching Authority, mailed Mar. 27, 2013 in corresponding PCT application No. PCT/SE2012/051135 (10 pages).

*Primary Examiner* — Alexander Thomas
(74) *Attorney, Agent, or Firm* — Buchanan Ingersoll & Rooney P.C.

(57) ABSTRACT

A rectangular stack of interfolded rectangular napkins including a plurality of napkins, each napkin in the stack comprising a first fold in a first direction, and a second fold in a second direction perpendicular to the first direction and bisecting the first fold and the napkin in the second direction, the intersecting first and second folds dividing the napkin into four panels with a pair of adjacent panels located on each side of the second fold, wherein each of the napkins within the stack includes at least one pair of panels arranged in the stack at a level between two pairs of adjacent panels of another of the absorbent napkins within the stack.

17 Claims, 3 Drawing Sheets

INTERFOLDED NAPKINS AND METHOD FOR INTERFOLDING NAPKINS

TECHNICAL FIELD

The invention pertains to a rectangular stack of interfolded rectangular napkins comprising a plurality of napkins, each napkin in the stack comprising a first fold in a first direction, and a second fold in a second direction perpendicular to the first direction whereby the intersecting first and second folds divide the napkin into four panels. The napkins are interlinked in the stack by means of each of the napkins within the stack comprising at least one pair of panels being sandwiched between a pair of adjacent panels of another of the absorbent napkins within the stack.

The invention also relates to a method of forming a stack of interfolded napkins.

BACKGROUND

The present disclosure relates generally to folded sheet material and arrays of folded sheet materials, and more particularly, to folded napkins and folded napkin arrays.

In commercial food service establishments and public restrooms, folded paper products such as paper napkins are typically provided in dispensers from which the products may be withdrawn by the patrons of those establishments. Whereas the highest quality paper napkins are invariably "server-controlled," i.e., delivered individually by a waiter or waitress, it is nevertheless desired to provide paper products in the user-dispensed application that are perceived as being of relatively higher quality.

Interfolded paper products, and especially interfolded paper napkins, have the advantage that they can be loaded into a dispenser whose faceplate cooperates with the stack of napkins to encourage users to remove napkins one at a time. This results in users taking fewer napkins than if it were possible or encouraged to remove a group of napkins simultaneously, although the paper product stack according to the invention may be used in dispensers that promote either one at a time or group dispensing.

Interfolded paper napkins applied to a user-dispensed environment include those that are single folded only. Patent literature describes a variety of arrangements of interfolded paper napkins having plural parallel folds, for example, in U.S. Pat. Nos. 5,118,554, 6,090,467 and 6,213,346.

Paper napkins that are single folded only (sometimes also called "half-folded" when the fold bisects the napkin, or "off-folded" when it does not) have the disadvantage that, in order to achieve a given total absorbency, the basis weight of the unfolded napkin sheet must be relatively high. This in turn causes the napkin to have relatively low softness and drape properties, both of which properties are important to the user's perception of the total quality of the napkin. The provision of plural parallel folds in a napkin has the obvious limitation that the napkin will have a relatively elongated shape in the direction parallel to the folds, unless the starting blank is cut to a relatively more elongated shape in the direction perpendicular to the folds.

Such interfolded paper napkins also include those that are folded at least twice about axes that are perpendicular to one another, as described in commonly-owned U.S. Pat. No. 7,611,765, the entirety of which patent is hereby expressly incorporated by reference. In embodiments of that patent wherein two folds each bisect the base napkin sheet, the area of the unfolded sheet will be approximately four times that of the folded napkin. U.S. Published Patent Application No. 2010/0055391 describes an array of folded sheet materials in which each sheet is first folded along a "medial" fold and then folded in a perpendicular direction in an "off-fold" location. However, an interfolded stack of such materials is subject to certain limitations as regards its appearance and dispensing, as discussed herein.

In most cases, napkins employed in connection with commercial food service or the "away-from-home" markets are not purchased by the end user. Thus, the primary considerations by a purchaser of these napkins are usually cost, number of napkins that can be fit into a dispenser and dispensability characteristics. However, there are a number of problems in trying to reduce the cost of a napkin. For example, a napkin has to be designed to be contained in a reasonably sized dispenser, be strong enough to resist tearing or other damage during the dispensing process and also be readily removable from the dispenser.

Accordingly, a continual need exists for improved napkins and arrays of napkins that meet the customer's needs.

SUMMARY OF THE DISCLOSURE

The invention provides a new and improved way of interfolding rectangular napkins and a stack of interfolded napkins having a highly beneficial configuration.

The disclosure offers a rectangular stack of interfolded rectangular napkins comprising a plurality of napkins, the stack having opposing parallel first and third sides and opposing parallel second and fourth sides perpendicular to the first and third sides, each napkin in the stack comprising a first fold in a first direction, and a second fold in a second direction perpendicular to the first direction and bisecting the first fold and the napkin in the second direction, the intersecting first and second folds dividing the napkin into four panels with a pair of adjacent panels located on each side of the second fold, wherein each of the napkins within the stack comprises at least one pair of panels arranged in the stack at a level between two pairs of adjacent panels of another of the absorbent napkins within the stack. The first fold divides the napkin into a smaller part and a larger part, wherein the area of the smaller part is between ⅕ and ½ of the area of the larger part and wherein the smaller part of the napkin is placed on the outside of the folded napkin, and that the napkins are placed in the stack with the first folds arranged in an alternating sequence along the first and third opposing parallel sides of the stack such that each napkin is arranged with the first fold opposite the first fold of any adjacent napkin in the stack.

The terms "larger" and "smaller" are used herein in a relative sense to define a size relationship between different parts or panels in the disclosed napkins and should not be understood as being absolute terms.

In each napkin, two of the four panels are of a first length in the second direction and two of the panels are of a second length in the second direction greater than the first length. Each of the pairs of panels located on either side of the second fold comprises one panel of the first length and one panel of the second length.

Within the stack of interfolded napkins according to the disclosure, each napkin receives between two inwardly facing adjacent panels a pair of adjacent panels from each of two napkins disposed respectively above and below said napkin in said stack. The only exceptions to this arrangement are found at the end napkins, i.e. the first and last napkins in the stack which have only a pair of panels from one adjacent napkin arranged between the inwardly facing panels of each end napkin.

When folded and arranged in the manner according to the disclosure, the resulting rectangular stack of interfolded napkins obtains a regular shape and an even bulk distribution. The even bulk distribution is primarily attributed to the alternating positioning of the smaller parts or smaller panels of the napkins in the stack. It is also of particular importance that the area or first length of the smaller panels does not exceed ½ of the area or second length of the larger panels. This requirement corresponds to an area of the smaller part of the non-folded napkin being at most ⅓ of the total area of the non-folded napkin. The size relationship may also be expressed as the length or extension of the smaller part of the non-folded napkin in the second direction being at most ⅓ of the total length of the non-folded napkin.

When folding a napkin such that the smaller part on one side of the first fold constitutes ⅓ of the area of the napkin while the larger part on the other side of the first fold constitutes the remaining ⅔ of the napkin, the smaller part will overlay with and cover half the area of the larger part after creating the first fold in the napkin. This means that when two napkins are placed in a stack with the first folds of the napkins forming outer opposing edges of the napkins and being arranged along opposing sides of the stack, the inner free edges of the smaller panels being constituted by the smaller parts of the napkins will meet each other without overlap along a centre line extending in the first direction of the stack of napkins.

If the size of the smaller parts were to exceed ⅓ of the napkin, it would result in an overlap between the edge parts along the inner free edges of the napkins when placed in the stack. With increasing number of napkins in the stack, the overlap would build up to form a ridge along the center of the stack and would distort the shape of the stack rendering the stack difficult to package and to place in a dispenser. Moreover, the ridge gives the stack an unappealing low-quality appearance. There is also a considerable risk that the overlapping edges of the napkins are folded or otherwise damaged during the interfolding step when the stacks are formed which also severely detracts from the appearance of the napkins and the shape of the stack.

On the other hand, if the size of the smaller parts is less than ⅓ of the napkin, there will be a gap in the center of the stack between the free edges of the opposing napkins. Such arrangement may be less preferred than an arrangement where the free edges are generally meeting although a gap leads to less distortion of the shape of the stack of napkins than an overlap between the edges and may, in fact, be desirable in order to ascertain that the napkin edges are not damaged during production of the stack. Accordingly, a gap of a few millimeters, such as 3 to 20 millimeters may be useful for this purpose and may have a negligible negative influence on the shape of the stack. The size of the gap should not be so great as to render the smaller panels too small to serve as gripping flaps on the outside of the folded napkins. For this reason, the area or length of the smaller part of each napkin should not be less than about ⅙ of the area or length of the napkin, i.e. not less than ⅕ of the area or length of the larger part.

In accordance with the disclosure, adjacent napkins in the stack may be interfolded so as to overlap in a direction of the equal width, such that each napkin in the stack overlaps each adjacent sheet by an approximately equal extent. This configuration gives the stack a "footprint" corresponding to the area of each of the larger panels.

The footprint area is preferably selected to meet user expectations. When the stack of napkins is placed in a standard dispenser, it should preferably fit the dispenser size in the same way as conventionally folded standard-sized napkins. By conforming to an expected appearance and perceived size, the napkins in the stack convey an assurance of quality to the buyer of the napkins as well as to the end users of the napkins.

Thus, in accordance with the disclosure it is possible to offer napkins of a reduced unfolded area which are perceived as being functionally equivalent to standard-size napkins as the folded area or footprint of the napkin is the same for both sizes of napkins. In addition to satisfying user expectations, the reduced size stacked napkins in accordance with the invention are arranged in a neat, shapely and volume-efficient stack that provides a means for increasing the number of napkins in a package or in a given volume without detriment to customer perception of the napkins in the stack. In this manner, napkins which are folded and stacked in accordance with the invention afford benefits with regard to economical packaging and transport. Moreover, as a standard-sized stack of napkins according to the disclosure contains more napkins than a conventional stack of the same size, the frequency of refills that have to be made is considerably lower when the napkins are used with a refillable dispenser. The reduction in fiber cost per napkin when compared to a corresponding standard-size napkin may be as much as 25% or more, with corresponding savings in packaging, transport and the subsequent handling of the stacks.

In accordance with the disclosure, the first fold in each napkin may be located such that the second length is at most about four times the first length and at least about two times the first length.

The first fold may be located such that the second length is twice the first length. As set out above, this size relationship may be particularly preferred as it offers a particularly even distribution of material in the stack.

In order to fit commonly available napkin dispensers, the napkins may have folded dimensions of approximately 4.25" by 6.5" (108 mm by 165 mm).

The unfolded dimensions of the napkins may be approximately 8.5" by 11" (216 mm×279 mm).

It is to be understood, that other sizes and size relationships are conceivable within the scope of the invention.

Each of the napkins in the stack may be a single ply paper napkin having a basis weight of from 10 to 20 lb, preferably from 11 to 17 lb, more preferably from 12 to 15 lb, and most preferably 13 lb. The expression of basis weight in pounds as used herein is with reference to a stack of 500 unfolded single ply sheets each measuring 24 by 36 inches.

Each of the napkins may bear an embossed surface relief applied by embossing rollers during a converting phase of manufacturing the napkins. An embossed surface may enhance the appearance of the napkin and giving the end user an impression of high quality. An embossed surface may also promote grippability of the napkin, in particular when placed at least partly on the smaller panel on the outside of the folded napkin. The embossed surface prevents the adjacent panels from sticking together and aids a user in identifying the location of the panel on top of the adjacent larger panel so that it may be more easily lifted and gripped, allowing the napkin to be removed from the stack of napkins.

In addition to or instead of embossments, each napkin may bear a print and/or be dyed or contain pigmented fibres. Embossments and prints may be applied in any pattern or combination of patterns, such as geometrical patterns, dot patterns, figurative patterns, ornamental patterns, texts, logotypes, etc. The embossments and/or prints may be applied over the full area of each napkins or may be applied to only a part of the area.

The disclosure also offers a method of forming a stack of interfolded napkins each napkin having opposing parallel first and third side edges and opposing parallel second and fourth side edges perpendicular to the first and third side edges.

The method comprises the steps of:
a) providing a plurality of non-folded rectangular napkins;
b) folding each napkin along a first axis parallel with the first and third side edges of the napkin to form a first fold, wherein the first fold is made to divide the napkin into a smaller part and a larger part, wherein the area of the smaller part is between 1/5 and 1/3 of the area of the larger part;
c) folding each napkin along a second axis parallel with the second and fourth side edges of the napkin to form a second fold that is perpendicular to the first fold and bisecting the first fold and the napkin and wherein the second fold is made to place the smaller part of the napkin on the outside of the folded napkin, and wherein the intersecting first and second folds divide the napkin into four panels with a pair of adjacent panels located on each side of the second fold, each pair of adjacent panels comprising a smaller panel formed from the smaller part of the napkin and a larger panel formed from the larger part of the napkin;
d) forming a rectangular stack of interfolded napkins by placing the napkins with the paired panels of the folded napkins in an overlapping configuration and by inserting a pair of adjacent panels of a following napkin between the pairs of adjacent panels of a preceding napkin within the stack; and
e) placing the napkins in the stack with the first folds arranged in an alternating sequence along opposing parallel sides of the rectangular stack with each napkin being arranged with the first fold opposite the first fold of any adjacent napkin in the stack.

Two of the panels may be of a first length in the second direction and two of the panels may be of a second length in the second direction greater than the first length and each of the pairs of panels comprises one panel of the first length and one panel of the second length.

Adjacent napkins may be interfolded so as to overlap in a direction of the equal width, such that each napkin with the stack overlaps each adjacent napkin by an approximately equal extent.

The first fold may be made in a location such that the second length is at most about four times the first length and at least about two times the first length. It may be preferred that the second length is twice the first length.

A stack of napkins which are interlinked by being interfolded in accordance with the disclosure may be placed in a dispenser. A common type of dispenser is a box having a dispensing opening through which the napkins are successively pulled out. The interfolding causes the napkins to be interlinked in such a way that when a first material sheet is extracted a predetermined part of a subsequent napkin is fed out through the dispensing opening. The dispenser may be a disposable dispenser, such as a cardboard box or may be a reusable dispenser which may be repeatedly refilled with new napkins, as the dispenser becomes emptied.

Napkins in the form of sheets of material intended for wiping and for hygienic purposes and provided in the form of stacks of napkins from which individual napkins can be readily removed when needed may in accordance with the invention be any kind of wet or dry napkin such as food service napkins, paper towels, disposable handkerchiefs, facial tissue, industrial napkins, toilet paper, etc. The material may be a fibrous material of any suitable kind such as cellulose based paper material, with or without admixture of man-made fibres, binders and fillers. The napkins may comprise only man-made fibres. However, it is usually desired that a napkin has some degree of absorbency or that it at least is wettable. If the fibrous material contains a large proportion of fibres of a hydrophobic character implying that the fibres are non-wettable by aqueous fluids, it may be suitable for wiping oily or greasy surfaces. A hydrophobic material may be treated with a wetting agent in order to make it more hydrophilic. The napkins of the invention are rectangular in shape, including quadratic shapes and may have any suitable size.

Preferably, the napkins are sized to fit in standard sized napkin dispensers. The napkins may be processed by one or more techniques such as embossing, printing and dyeing if desired. The napkins may be single-ply sheets of material or may comprise two or more plies of the same or different materials. The napkins may contain additives such as lotions, perfumes, detergents, liquids, etc. as known in the art.

Interfolded napkins are commonly understood as being sheets of material arranged in a stack of superposed sheets which are each folded at least once. The sheets are interlinked in such a way that the separate folded sheets of material form a chain of sheets where each sheet has a leading panel and a trailing panel, the trailing panel being at least partly overlapped with the leading panel of the subsequent sheet in the stack. In this manner, the individual sheets are held loosely together by means of frictional forces arising between the overlapping parts of the panels. When more complicated folding arrangements are used, the leading and trailing panels may be separated by one or more intermediate panels. In the folding arrangement of the present invention, a first pair of leading panels is contiguous with a second pair of trailing panels following directly after the leading panels. The sheets can be dispensed from the opening in a dispenser box by pulling at the exposed smaller leading panel of the first sheet in the stack. In this manner, the first sheet may be pulled away at the same time as a predetermined part of the leading panel pair of the following sheet becomes exposed at the dispensing opening and arranged in a dispensing position where it may subsequently be gripped and removed from the dispenser.

Napkins in accordance with the disclosure may be formed from absorbent sheets and may be of a variety of types, including, without limitation, dry crepe tissue; wet crepe tissue; creped TAD (through air dried) tissue; uncreped TAD tissue; structure or textured tissue, made using a process including the step of using pressure, vacuum, or air flow through the wet web (or a combination of these) to conform the wet web into a shaped fabric and subsequently drying the shaped sheet using a Yankee dryer, or series of steam heated dryers, or some other means, including but not limited to tissue made using the ATMOS process developed by Voith or the NTT process developed by Metso; fabric creped tissue, made using a process including the step of transferring the wet web from a carrying surface (belt, fabric, felt, or roll) moving at one speed to a fabric moving at a slower speed (at least 5% slower) and subsequently drying the sheet. Those skilled in the art will recognize that these processes are not mutually exclusive, e.g., an uncreped TAD process may include a fabric crepe step in the process.

The napkins according to the disclosure are preferably embossed, particularly when they are in the form of paper napkins the paper of which is formed on a traditional Yankee cylinder/dry crepe forming line. As used herein, the term "embossed" connotes a three-dimensional low relief pattern of a distinct pattern or image. Such embossing may be applied by conventional embossing rollers during the converting phase of the napkin manufacturing, preferably upstream of the folding and interfolding, and/or may be formed by a selected pattern of the TAD fabric, if the napkins are made by the TAD technique. Similarly, the term embossing as used herein may embrace the pattern imparted to structure or textured tissue by the textured papermaking fabrics used to make them, regardless of whether the textured papermaking fabrics include additional distinct design elements (see, for example, U.S. Pat. No. 7,624,765). The term "embossed" as used herein does not embrace, however, any incidental surface roughness imparted to a napkin sheet by the forming fabric used in a traditional Yankee cylinder/dry crepe forming line, which surface roughness does not display any predetermined pattern to the unaided eye.

When the napkins according to the disclosure are embossed during a converting phase utilizing embossing rollers, the embossing rollers will preferably be of the type in which one roller bears a male pattern comprising all or a majority of projecting embossing elements, and the other roller bears a female pattern comprising all or a majority of cooperating recessed embossing elements.

BRIEF DESCRIPTION OF THE DRAWINGS

The invention will be described in greater detail below with reference to the figures shown in the appended drawings.

DETAILED DESCRIPTION

Figure 1:
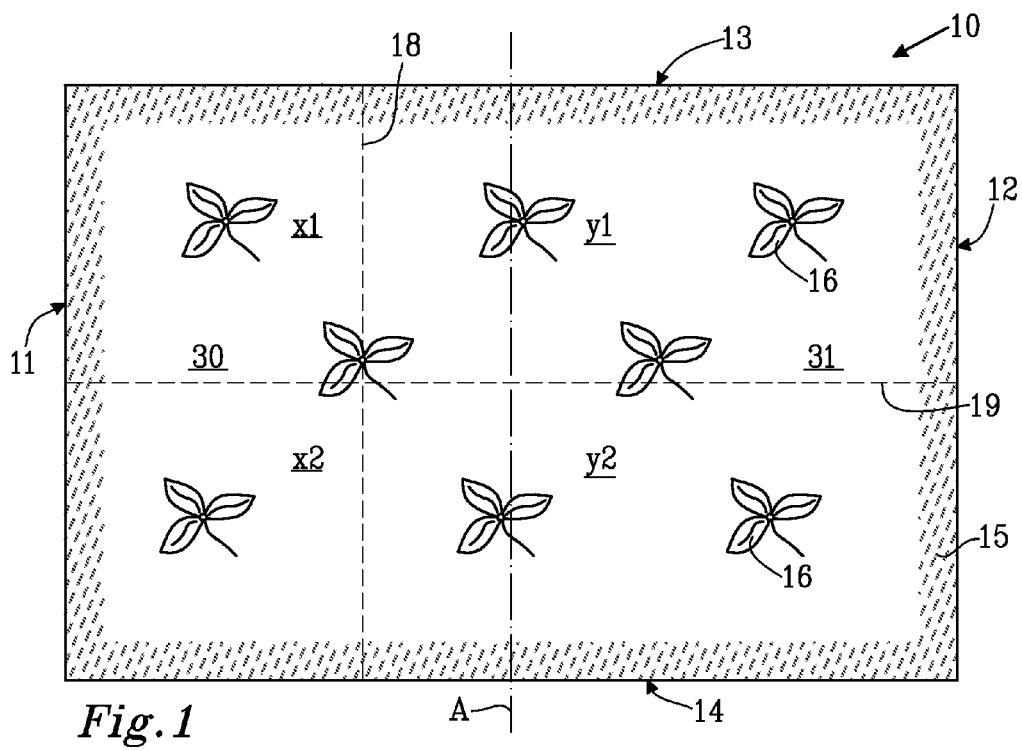
FIG. 1 is a view of an individual unfolded napkin according to the present invention.

In FIG. 1 a rectangular napkin 10 is depicted as it appears in a non-folded configuration with two parallel short side edges 11, 12 and two parallel long side edges 13, 14 perpendicular to the short side edges 11, 12. The napkin, prior to folding, preferably has dimensions of approximately 8.5"×11" (216 mm×279 mm). However, those dimensions should not be considered limiting to the invention and may of course be varied to suit the particular desired application of the napkin.

The napkin is shown with an optional embossed frame pattern 15 comprising a plurality of small individual embossments such as dots, short lines, etc. The napkin is also shown with an optional printed or embossed leaf pattern 16. When present, printed and embossed patterns may take any form as known in the art and may include figurative pattern elements as well as ornamental elements, dots, lines and other geometrical elements, texts, logotypes etc. Printed and embossed patterns may be used to bond the plies together in multi-ply napkins. An embossed pattern placed at the edge of the napkin, as shown in FIG. 1, may stabilize the napkin and facilitate identification of the napkin edge when the napkin is folded so that the napkin edge may be readily lifted from underlying material as will be further described herein. The presence of printed and/or embossed features as shown in the figures should not be considered limiting to the invention. Moreover, print and/or embossments may be differently placed and may occupy a larger or smaller area than in the example shown in the figures. The invention is also applicable to napkins completely without print and/or embossments.

When the napkins according to the invention are to be used in a commercial establishment, such as a fast-food restaurant or a convenience store, it may be desirable for the napkins to bear the name and/or the logo of the establishment in which the napkins will be dispensed. In that case the name and/or logo may be formed by embossing, or by printing the napkin with an ink that sufficiently contrasts with the color of the paper stock, or by a combination of those techniques.

Figure 2:
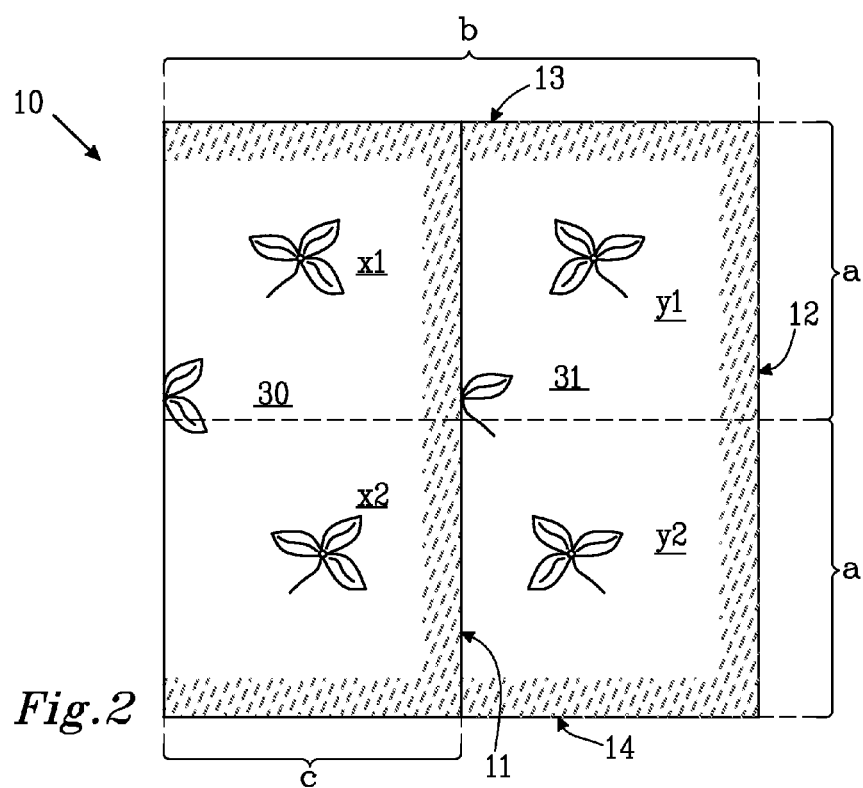
FIG. 2 is a view of the napkin in FIG. 1 after having been folded a first time.
Figure 3:
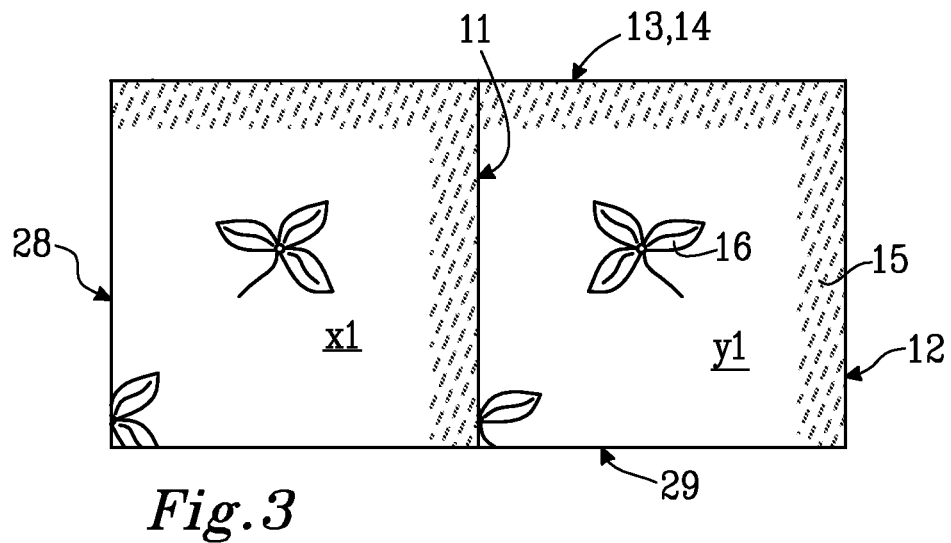
FIG. 3 is a view of the napkin in FIGS. 1 and 2 after having been folded twice.
Figure 4:
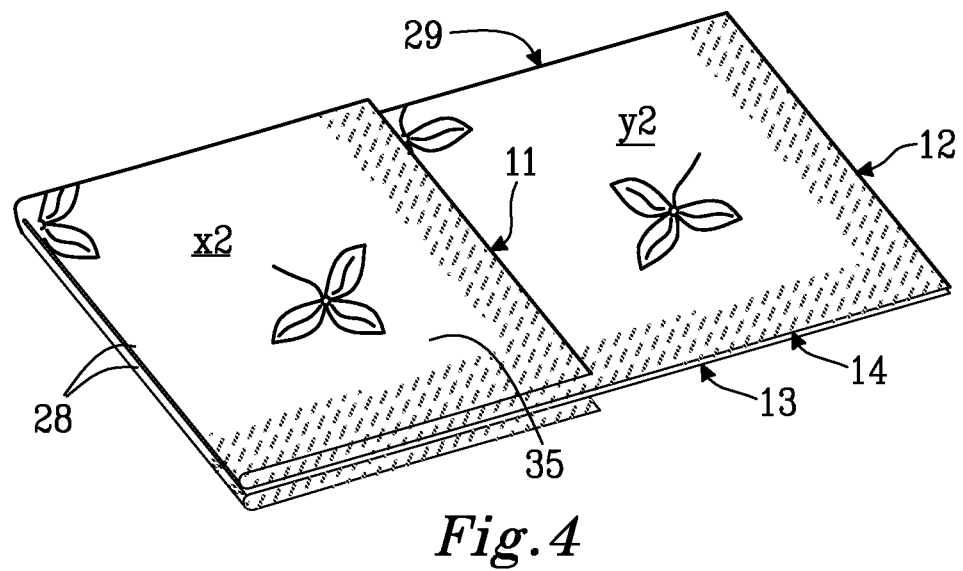
FIG. 4 is a perspective view of the napkin in FIG. 3.

The napkin 10 is first folded along a fold line 18, as indicated in FIG. 1 to form a first fold 28 as shown in FIG. 2. The napkin 10 is then folded a second time along a fold line 19 that is perpendicular to the fold line 18 to form a second fold 29, bisecting the napkin 10 in a direction parallel to the long side edges 13, 14, as shown in FIGS. 3 and 4. The first fold 18 is parallel to the short side edges 11, 12 of the napkin 10, and may, thus, have a length of 8.5". When the napkin is a non-square rectangle as in FIG. 1, the first fold is preferably parallel to the short side edges of the rectangle, and thus perpendicular to the long side edges 13, 14.

The first fold 28 is deliberately offset from a line A parallel to it that would bisect the napkin 10. Accordingly, the fold 28 divides the napkin into a smaller part 30 and a larger part 31. The fold 15 will typically be located such that the length "b" will be at most about 5 times the length "c", and at least about 2 times the length "c". Preferably, the length "b" is between 2,1 and 3 times the length "c" and most preferably approximately 2 times the length "c". The exact dimensions are, of course, dependent on the size of the particular napkin. However, it has been discovered that the length "c" should preferably be at least 1 inch. Moreover, for reasons of production when interfolding the napkins, it may be desirable that the length "c" of the smaller part 30 is a little less than ⅓ of the total length (b+c) of the non-folded napkin, such as up to 1 inch less than ⅓ of the length (b+c) when the napkin has a total length (b+c) of 11" (216 mm).

When starting from a non-folded napkin 10 having the dimensions 8.5"×11" (216 mm×279 mm) as set out above, the fully folded napkin 10 illustrated in FIG. 3 will have dimensions of approximately 4.25"×6.5" (108 mm by 165 mm). Those are the same dimensions of the fully folded napkin in the preferred quarter-folded embodiment of commonly-owned U.S. Pat. No. 7,611,765; however, in commonly-owned U.S. Pat. No. 7,611,765 the base napkin sheet has dimensions of approximately 8.5"×13" (216 mm×330 mm) whereas the corresponding base napkin sheet of the present invention may have a base dimension of only about 8.5"×11" (216 mm×279 mm). The present invention therefore provides a product that in its fully folded configuration has the same footprint as the preferred napkin described in the earlier patent, yet which is made with at least about 25% less paper. Moreover, as the thinner part of the folded napkin occurs over only a minority of the length of the longer side thereof, the tactile perception and performance of the napkin is not significantly affected.

When the napkin 10 is folded, the folds 28, 29 divide the napkin into four panels x1, x2 and y1, y2, wherein the two panels x1, x2 which are formed from the smaller part 30 of the napkin 10 are smaller than the two panels y1, y2 which are formed from the larger part 31 of the napkin 10. After the napkin 10 has been folded the second time, to create the second fold 29, the panels x1, x2, y1, y2 can be considered to form pairs of panels located on either side of the second fold 29. Each such pair of panels consists of a smaller panel x1, x2 and the corresponding larger panel y1, y2. The napkins are folded with the larger panels y1, y2 facing each other on the inside of the folded napkin 10 and the smaller panels x1, x2 facing away from each other on the outside of the folded napkin, as is illustrated in FIG. 4. The exposed smaller panel x2 in FIG. 4 may be used as a gripping means 35 for gripping and pulling the napkin 10 away from a stack of napkins, as described herein.

Figure 5:
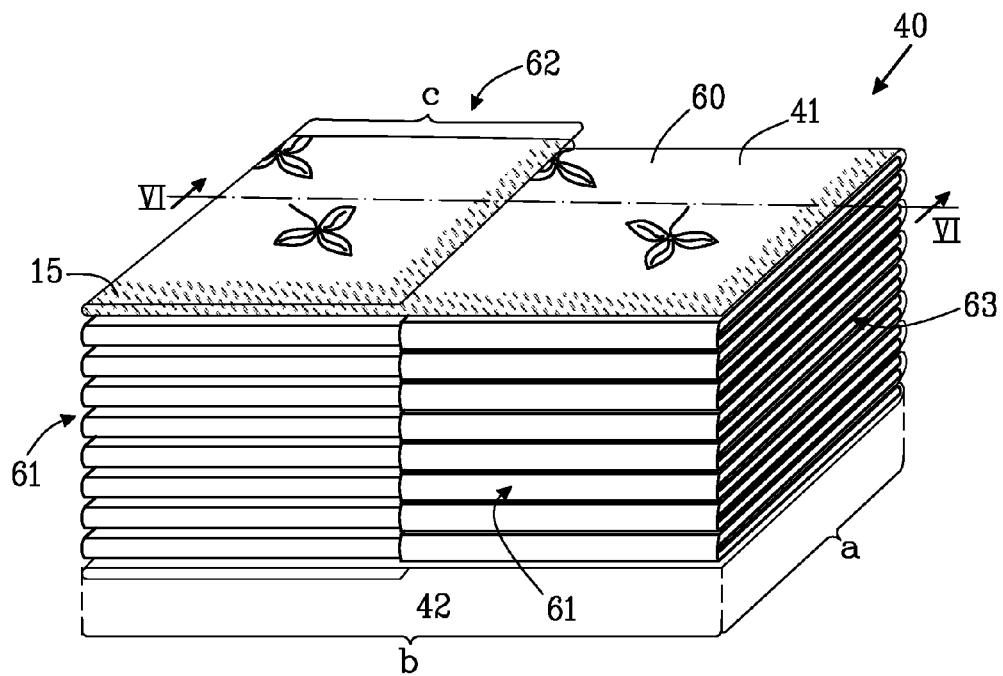
FIG. 5 is a perspective view of a stack of interfolded napkins.
Figure 6:
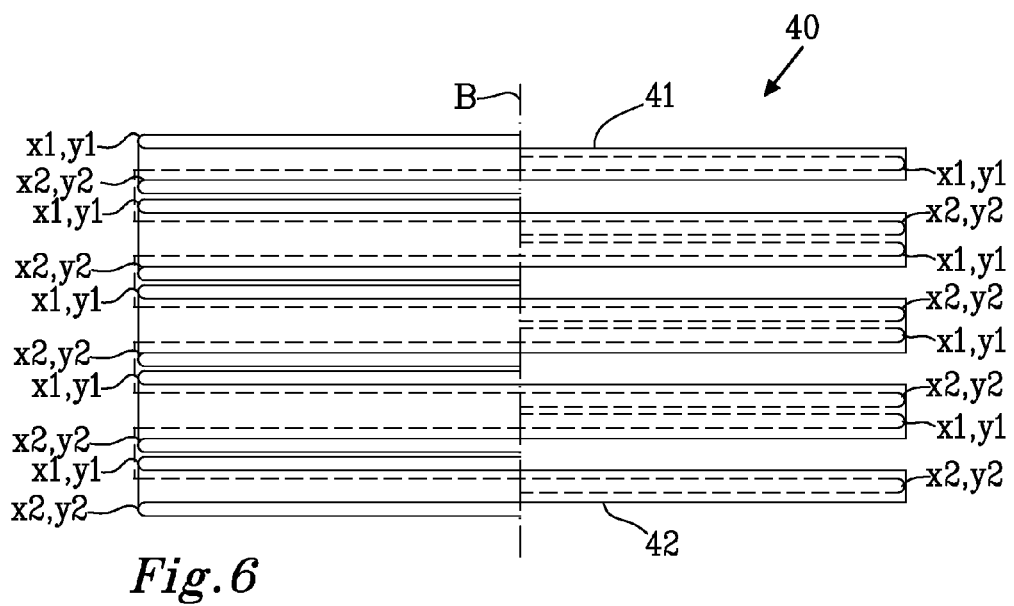
FIG. 6 is a schematic section taken at the line VI-VI through the stack of interfolded napkins in FIG. 5.

FIGS. 5 and 6 depict schematically the manner in which the folded napkins of the invention may be interfolded to form a stack 40 of folded and interfolded napkins according to the invention. As seen in FIG. 6, the interfolding of adjacent napkins is such that any given napkin within the stack receives, between a pair of adjacent panels x1, y1; x2, y2 of the given napkin, a pair of adjacent panels x2, y2 of an upper napkin and a pair of adjacent panels x1, y1 of a lower napkin within the stack 40. At the upper and lower ends of the stack 40 only one pair of panels from an adjacent napkin is sandwiched between each pair of panels of the end napkins 41, 42.

Such an interfolding arrangement is shown in the context of single folded paper towels, in U.S. Pat. Nos. 1,427,420 and 1,632,446. A quarter-fold interfolded napkin is described in commonly-owned U.S. Pat. No. 7,611,765. Web interfolding machines are described in U.S. Pat. Nos. 3,285,599 and 3,291,479, the entireties of which patents are hereby expressly incorporated by reference.

In FIG. 5 it can be seen that the napkins 10 as interfolded within the stack 40 alternate between first napkins 50 oriented as in FIG. 4, with the second fold 29 being visible to a viewer of FIG. 5 at the front or second side 61 of the stack 40, and second napkins 60 oriented as if the napkin of FIG. 4 were rotated 180° about an axis perpendicular to the napkin, such that the second fold 29 is at the back or fourth side 62 of the stack 40 as shown in FIG. 5. Accordingly, only folded edges 29 are exposed on the front and back sides 61, 62 of the stack 40 as shown in FIG. 5 except from the uppermost napkin 41 that has a long side edge 13 visible from the front 61. An exposed edge of the lowermost napkin 42 is also exposed on the back 62 of the stack 40 but is hidden from view in FIG. 5.

The napkins 50, 60 are further arranged so that all the first napkins 50 are arranged with the first fold 28 facing the right-hand side 63 of the stack 40 as seen in FIG. 5 and with all the second napkins arranged with the first fold 28 facing the left-hand side 64 of the stack 40.

The interfolding arrangement depicted in FIGS. 5 and 6 thus reveals another significant advantage of the folding arrangement according to the present invention, in that the overlapping panels of adjacent napkins are all of equal width "a" in the direction of interfolding. This is again in contrast to an arrangement as described in U.S. Published Patent Application No. 2010/0055391, wherein the folding configuration requires that in the interfolded stack of napkins each napkin will overlap unequally with each adjacent napkin. Consequently, when the stack is loaded into a dispenser in one direction, the emergence of a next napkin upon dispensing of an upstream napkin will require that a short panel pair pull out a long panel pair despite only partial overlap between the panel pairs, whereas when the stack is loaded in the other direction the leading edge of each next napkin will be the short panel pair, which affords users only a reduced grasping area with consequent risk of cross-contamination of the dispenser surfaces.

By contrast, in the stack of interfolded napkins as depicted in FIGS. 5 and 6 there is no difference between the top of the stack and the bottom, in that the napkins will be dispensed the same way whether the stack is loaded into a dispenser top up or bottom up.

A stack of interfolded napkins in accordance with the invention has an even bulk distribution. As can be readily gleaned from FIG. 6, the alternating positioning of the smaller panels x1, y1 of the napkins 50, 60 in the stack 40 results in an equal amount of napkin material being placed on each side of a line B dividing the stack in two halves. It is important that the first length "c" of the smaller panels x1, x2 does not exceed ½ of the second length "b" of the larger panels y1, y2. This requirement corresponds to an area of the smaller part 30 of the non-folded napkin 10 in FIG. 1 being at most ⅓ of the total area of the non-folded napkin. The size relationship may also be expressed as the length "c" or extension of the smaller part of the non-folded napkin being at most ⅓ of the total length (b+c) of the non-folded napkin.

With reference to FIG. 1, when folding a napkin 10 such that the smaller part 30 on one side of the first fold 28 constitutes ⅓ of the total area of the napkin while the larger part 31 on the other side of the first fold 28 constitutes the remaining ⅔ of the napkin, the smaller part 30 overlays with and covers half the area of the larger part 31 after creating the first fold 28 in the napkin 10. With reference to FIG. 5, this is can be seen to have the effect that when two napkins 50, 60 are placed in the stack 40 with the first folds 28 of the napkins forming outer opposing edges of the napkins at the first and third sides 63, 64 of the stack 40, the inner free edges of the smaller panels being constituted by the smaller parts of the napkins will only reach to the centre line B in FIG. 6 without crossing that line or overlapping in the center of the stack 40.

If the size of the smaller parts were to exceed ⅓ of the napkin, it would result in an overlap between the edge parts along the inner free edges of the napkins when placed in the stack. The overlap would build up to form a ridge along the center of the stack and would distort the shape of the stack rendering the stack difficult to package and to place in a dispenser. Moreover, the ridge gives the stack an unappealing low-quality appearance. There is also a considerable risk that the overlapping edges of the napkins get caught in each other during the interfolding step when the stacks are formed so that the napkin edges are folded or otherwise damaged which also severely detracts from the appearance of the napkins and the shape of the stack.

If the size of the smaller parts is smaller than ⅓ of the napkin, there will be a gap in the center of the stack between the free edges of two opposing napkins. Such arrangement may be less preferred than an arrangement where the free edges are generally placed at the center line B. However, a gap leads to less distortion of the shape of the stack of napkins than an overlap between the edges and may be desirable in order to ascertain that the napkin edges are not damaged during production of the stack. Accordingly, a gap in the order of a few millimeters, such as 3 to 20 millimeters may be useful for this purpose. The size of the gap should not be so great as to render the smaller panels too small to serve as gripping flaps on the outside of the folded napkins. For this reason, the area or length of the smaller part of each napkin should not be less than about ⅙ of the area or length of the napkin, i.e. not less than ⅕ of the area or length of the larger part.

When pulling away a napkin from the stack 40, the user may easily grip the exposed smaller panel, x1, of the uppermost napkin 41, using the panel as a gripping means 35. Identification of the gripping means 35 is facilitated by the optional provision of edge embossments 15 which serve as a tactile and visual indicator of the location of the gripping means 35.

Folding and interfolding of the napkins into a stacked configuration in accordance with the invention may be made by a method involving folding individual napkins a first and a second time as disclosed herein and subsequently interfolding the napkins while rotating every other napkin 180° in relation to the preceding napkin and to the following napkin so that the smaller panels become arranged on alternating sides of the resulting stack of napkins.

As noted above, when the napkins according to the invention are to be used in a convenience store or a food establishment, particularly a fast food franchise, it is contemplated that the embossing might take the form of a logo of the store or restaurant in which the napkins will be used, either alone or in combination with a decorative border.

The basis weight of the absorbent napkins according to the invention is preferably within the range of a high quality napkin, and thus less than that of commercially available single folded paper napkins, whose higher basis weight places them closer to the category of paper towels. Preferred embodiments have a basis weight of about 13 lb, calculated as defined above. However, it will be appreciated by those skilled in the art that the basis weight may vary over a broader range, from about 10 to 20 lb per unfolded napkin, more preferably from about 11 to about 17 lb, and still more preferably from about 12 to about 15 lb.

While this range of basis weights is greater than that commonly used for facial tissue (wherein a basis weight of 8½ to 9 lb per ply is typical), it is distinctly less than the basis weights found in commercially available single-fold napkin/towels, which tend to have basis weights in excess of 20 lb. Thus, by providing a paper napkin wherein the napkin has a relatively low basis weight, yet the napkin is folded to have at least four panels, the invention provides a napkin that is comparatively softer and has improved drape properties in relation to single fold products.

The invention also contemplates the use of the novel stack of napkins in a variety of dispensers. One example is a dispenser having a downwardly-directed opening, such as that described in commonly-owned co-pending application Ser. No. 10/660,659, the entirety of which is hereby expressly incorporated by reference. Other examples are dispensers having an upwardly directed opening, or a lateral opening. A dispenser having an upwardly directed opening and suited for dispensing the absorbent napkin products according to the invention is described in commonly-owned U.S. Pat. No. 7,178,689, the entirety of which is hereby expressly incorporated by reference.

While the present invention has been described in connection with various preferred embodiments thereof, it is to be understood that those embodiments are provided merely to illustrate the invention, and should not be used as a pretext to limit the scope of protection conferred by the true scope and spirit of the appended claims.

The invention claimed is:

1. A rectangular stack of interfolded rectangular napkins comprising a plurality of napkins, said stack having opposing parallel first and third sides and opposing parallel second and fourth sides perpendicular to said first and third sides, each napkin in said stack comprising a first fold in a first direction, and a second fold in a second direction perpendicular to said first direction and bisecting said first fold and said napkin in said second direction, said intersecting first and second folds dividing said napkin into four panels with a pair of adjacent panels located on each side of said second fold, wherein each of said napkins within said stack comprises at least one pair of panels arranged in the stack at a level between two pairs of adjacent panels of another of said absorbent napkins within said stack, said first fold divides said napkin into a smaller part and a larger part, wherein the area of the smaller part is between ⅕ and ½ of the area of the larger part and wherein said smaller part of said napkin is placed on the outside of the folded napkin, and that said napkins are arranged in said stack with said first folds arranged in an alternating sequence along said first and third opposing parallel sides of said stack such that each napkin is arranged with said first fold opposite said first fold of any adjacent napkin in said stack.

2. The stack of napkins according to claim 1, wherein two of said panels being of a first length in said second direction and two of said panels being of a second length in said second direction greater than said first length and wherein each of said pairs of panels comprise one panel of said first length and one panel of said second length.

3. The stack of napkins according to claim 2, wherein adjacent napkins are interfolded so as to overlap in a direction of equal width, such that each napkin in said stack overlaps each adjacent napkin by an approximately equal extent.

4. The stack of napkins according to claim 2, wherein said first fold is located such that said second length is at most about four times said first length and at least about two times said first length.

5. The stack of napkins according to claim 4, wherein said first fold is located such that said second length is twice said first length.

6. The stack of napkins according to claim 1, wherein each of said napkins has folded dimensions of approximately 4.25" by 6.5" (108 mm by 165 mm).

7. The stack of napkins according to claim 1, wherein each of said napkins has unfolded dimensions of approximately 8.5" by 11" (216 mm by 279 mm).

8. The stack of napkins according to claim 1, wherein each of said absorbent napkins is a single ply paper napkin having a basis weight of from 10 to 20 lb.

9. The stack of interfolded napkins according to claim 1, wherein each of said napkins bears an embossed surface relief applied by embossing rollers during a converting phase of manufacturing said napkins.

10. The stack of napkins according to claim 1, wherein each of said absorbent napkins is a single ply paper napkin having a basis weight of from 11 to 17 lb.

11. The stack of napkins according to claim 1, wherein each of said absorbent napkins is a single ply paper napkin having a basis weight of from 12 to 15 lb.

12. The stack of napkins according to claim 1, wherein each of said absorbent napkins is a single ply paper napkin having a basis weight of about 13 lb.

13. A method of forming a stack of interfolded napkins each said napkin having opposing parallel first and third side edges, and opposing parallel second and fourth side edges perpendicular to said first and third side edges, the method comprising:

a) providing a plurality of non-folded rectangular napkins;

b) folding each said napkin along a first axis parallel with said first and third side edges of said napkin to form a first fold, wherein said first fold is made to divide said napkin into a smaller part and a larger part, wherein the area of said smaller part is between ⅕ and ⅓ of the area of said larger part;

c) folding each said napkin along a second axis parallel with said second and fourth side edges sides of said napkin to form a second fold that is perpendicular to said first fold and bisecting said first fold and said napkin and wherein said second fold is made to place said smaller part of said napkin on the outside of said folded napkin, and wherein said intersecting first and second folds divide said napkin into four panels with a pair of adjacent panels located on each side of said second fold, each pair of adjacent panels comprising a smaller panel formed from said smaller part of said napkin and a larger panel formed from said larger part of said napkin;

d) forming a rectangular stack of interfolded napkins by placing said napkins with said paired panels of said folded napkins in an overlapping configuration and by inserting a pair of adjacent panels of a following napkin between said pairs of adjacent panels of a preceding napkin within said stack; and e) placing said napkins in said stack with said first folds arranged in an alternating sequence along opposing parallel sides of said rectangular stack with each napkin being arranged with said first fold opposite said first fold of any adjacent napkin in said stack.

14. The method according to claim 13, wherein two of said panels are of a first length in said second direction and two of said panels are of a second length in said second direction greater than said first length and wherein each of said pairs of panels comprise one panel of said first length and one panel of said second length.

15. The method according to claim 14, wherein adjacent napkins are interfolded so as to overlap in a direction of equal width, such that each absorbent napkin within said stack overlaps each adjacent napkin by an approximately equal extent.

16. The method according to claim 13, wherein said first fold is in a location such that said second length is at most about four times said first length and at least about two times said first length.

17. The method according to claim 16, wherein said first fold is located such that said second length is twice said first length.

* * * * *